United States Patent [19]
Tate et al.

[11] 3,975,281
[45] Aug. 17, 1976

[54] METHOD FOR TREATING SCALE
[75] Inventors: Jack F. Tate; Jim Maddox, Jr., both of Houston, Tex.
[73] Assignee: Texaco Inc., New York, N.Y.
[22] Filed: Dec. 26, 1973
[21] Appl. No.: 428,550

[52] U.S. Cl. .............................. 252/180; 210/58; 252/8.55 B
[51] Int. Cl.² .................................................. C02B 5/06
[58] Field of Search ................ 252/8.55 B, 8.55 D, 252/180; 210/58

[56] References Cited
UNITED STATES PATENTS

| | | | |
|---|---|---|---|
| 2,592,511 | 4/1952 | Chittum | 252/181 |
| 3,434,969 | 3/1969 | Ralston | 252/180 X |
| 3,526,592 | 9/1970 | Quimby | 252/545 X |
| 3,551,339 | 12/1970 | Quimby | 252/551 X |
| 3,597,352 | 8/1971 | Standord et al. | 210/58 X |
| 3,684,720 | 8/1972 | Richardson | 252/8.55 X |
| 3,725,290 | 4/1973 | Nelson et al. | 252/180 X |
| 3,811,505 | 5/1974 | Flournoy et al. | 252/8.55 X |

*Primary Examiner*—Herbert B. Guynn
*Attorney, Agent, or Firm*—T. H. Whaley; C. G. Ries; James F. Young

[57] ABSTRACT

Composition and method for the treatment of scale, particularly calcium and/or barium sulfate scale, using an alkyl benzene sulfonate, including the alkali metal and ammonium salts thereof, said alkyl group containing from about 8 to about 14 carbon atoms at a concentration of from about 10 to about 50 ppm on a weight basis.

8 Claims, No Drawings

METHOD FOR TREATING SCALE

This invention relates to a composition useful in treating oil and gas wells and to a method of using such composition for such treatment. More particularly this invention is directed to a composition and method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of crystalline calcium sulfate which gradually builds up on the walls of the well tubing, for example, to a point where it may choke off fluid flow in the tube if remedial measures were not undertaken.

Another cause of the scale formation is attributed to the precipitation of scale material from potentially super-saturated solutions thereof. When the operating variables of temperature and pressure change adversely, or solvent is allowed to evaporate, thus concentrating the solutions, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising an aqueous solution of an alkyl benzene sulfonate containing from about 8 to 14 carbon atoms in the alkyl group thereof, the corresponding alkali metal salts including ammonium, as well as mixtures thereof in a concentration of from about 10 ppm to about 50 ppm, on a weight basis.

The invention also comprises a method of treating equipment susceptible to the development of scale deposits therein such as water storage tanks and the like, particularly oil field equipment, using the scale prevention composition.

Representative alkyl benzene sulfonates, including the straight and branched chain alkyl groups, useful in the practice of the invention include the octyl-, nonyl-, decyl-, undecyl-, dodecyl, tridecycl- and tetradecyclbenzene sulfonates, the corresponding sodium, potassium, ammonium salts thereof as well as mixtures of one or more of said compounds. A preferred group is the $C_{10}$–$C_{14}$ alkyl benzene sulfonates and the salts thereof.

In carrying out one aspect of the present invention the method thereof comprises introducing the scale prevention composition into the equipment to be protected, such as oil well tubing, in the form of an aqueous solution in an amount sufficient to provide the alkyl benzene sulfonate therein in an amount of from about 10 to 50 ppm, based on the weight of said sulfonate, and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e. by passing the solution into said strata such as by injection of the solution down through the bore hole or production tubing, preferably under pressure.

Use of the alkyl benzene sulfonate including the salts thereof in an amount of below about 10 ppm and above about 50 ppm causes adverse results. The lesser amounts do not provide satisfactory scale inhibiting properties while the amounts above about 50 ppm result in the precipitation of the sulfonate at high calcium ion concentration, i.e. above about 1% on a weight basis.

In general, it has been found that excellent protection against objectionable scale deposits can be obtained by maintaining the treating composition in contact with the scale for a contacting time period of from about 2 to 24 hours and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention i.e. on a semiweekly or weekly basis, then shorter contacting times (e.g. averaging about 4 to 10–12 hours) can be used. Less frequent treating intervals, i.e. at about every 10 or 15 days generally necessitate corresponding longer contacting times that may average between 12 and 24 hours.

The scale prevention composition of the present invention is used in an amount sufficient to provide to the treating solution the alkyl benzene sulfonate including the salts and mixtures, in an amount of from about 10 to about 50 ppm by weight. It has been found that excellent results can be obtained at a concentration of from about 10 to 30 ppm by weight.

A more complete understanding of the invention will be obtained from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 ppm of calcium sulfate and 50,000 ppm of sodium chloride. A metal rotor attached to an externally provided mechanical stirring device was immersed in the test solution for a 24 hour time period. The solution was maintained at a temperature of 118°F. during the test period. At the end of the 24 hours, the rotor was removed from the solution and from the stirrer, the scale deposited thereon removed, dried and weighed. In all, several tests were conducted on each material being evaluated and the average of the tests was taken as the amount of scale deposit. The above laboratory test procedure affords good correlation between the results thereby obtained and larger scale field evaluations of scale preventing compositions.

The following table records the results of the tests.

TABLE

| Example | Amount of Additive ppm.** | Average Weight of Scale (grams) Deposited |
|---|---|---|
| Blank* | — | 1.9 |
| 1 | 2 | 2.01 |
| 2 | 5 | 2.12 |
| 3 | 10 | 0.0 |
| 4 | 15 | 0.01 |

*Weight of scale deposited on rotor in the absence of additive.
**Additive — ammonium salt of dodecyl benzene sulfonate.

From the data in the above table it is evident that the compounds of the present invention are effective calcium sulfate scale inhibitors at concentrations above about 5 ppm, i.e. at concentrations in the range of from about 10 to about 50 ppm.

Obviously, other modifications and variations of the invention as hereinbefore set forth may be made without departing from the spirit and scope thereof, and therefore, only such limitations should be imposed as are indicated in the appended claims.

We claim:

1. A method of controlling the build-up of scale deposits selected from the group consisting of calcium sulfate scale and barium sulfate scale in an aqueous system which comprises incorporating in said system a scale treating composition consisting essentially of an aqueous solution of a compound selected from the group consisting of an alkyl benzene sulfonic acid containing from about 8 to about 14 carbon atoms in the alkyl radical, the corresponding alkali metal and ammonium salts thereof, and mixtures thereof, in a concentration of from about 10 to about 30 ppm, on a weight basis.

2. Method as claimed in claim 1 wherein said alkyl benzene sulfonic acid is dodecyl benzene sulfonic acid.

3. Method as claimed in claim 1 wherein said compound is the ammonium salt of dodecyl benzene sulfonic acid.

4. Method as claimed in claim 1 wherein said compound is a mixture of the ammonium salt and the sodium salt of dodecyl benzene sulfonic acid.

5. Method as claimed in claim 1 wherein said compound is an alkali metal salt of decyl benzene sulfonic acid.

6. Method as claimed in claim 1 wherein said alkyl benzene sulfonic acid is tridecyl benzene sulfonic acid.

7. Method as claimed in claim 1 wherein said compound is the sodium salt of dodecyl benzene sulfonic acid.

8. Method as claimed in claim 1 wherein said alkyl benzene sulfonic acid contains from about 10 to 14 carbon atoms in the alkyl group.

* * * * *